United States Patent
Kobayashi et al.

[11] Patent Number: 5,972,052
[45] Date of Patent: Oct. 26, 1999

[54] FABRICATION METHOD OF SOLID ELECTROLYTIC CAPACITOR

[75] Inventors: Atsushi Kobayashi; Takashi Fukaumi; Tomohide Date; Masashi Ooi, all of Tokyo, Japan

[73] Assignee: NEC Corporation, Tokyo, Japan

[21] Appl. No.: 08/866,271

[22] Filed: May 30, 1997

[30] Foreign Application Priority Data

May 30, 1996 [JP] Japan .................................. 8-136684

[51] Int. Cl.⁶ ............................................... H01G 9/00
[52] U.S. Cl. ........................................... 29/25.03; 438/99
[58] Field of Search ........................ 29/25.03; 438/99, 438/250, 253, 393, 396

[56] References Cited

U.S. PATENT DOCUMENTS

| | | | |
|---|---|---|---|
| 4,609,971 | 9/1986 | Shaffer | 438/99 |
| 5,428,500 | 6/1995 | Nishiyama et al. | 29/25.03 |
| 5,457,862 | 10/1995 | Sakata et al. | 29/25.03 |
| 5,586,000 | 12/1996 | Sakata et al. | 29/25.03 |

FOREIGN PATENT DOCUMENTS 63-173313  7/1988  Japan .
7-369819  12/1992  Japan .
7-94368   4/1995  Japan .

*Primary Examiner*—Chandra Chaudhari
*Attorney, Agent, or Firm*—Sughrue, Mion, Zinn, Macpeak & Seas, PLLC

[57] ABSTRACT

A fabrication method of a solid electrolytic capacitor is provided, which is able to form the surface irregularity of a conductive polymer layer serving as a solid electrolyte with good controllability and good stability. A capacitor body is formed by a valve metal. The body serves as an anode of the capacity. An oxide layer is formed to cover the surface of the capacitor body. The oxide layer serves as a dielectric of the capacitor. A first conductive polymer layer is formed on the oxide layer. The first conductive polymer layer serves as a part of a solid electrolyte of the capacitor. A powder of a conductive polymer is deposited on the first conductive polymer layer by spraying a fluid containing the powder on the first conductive polymer. A second conductive polymer layer is formed on the first conductive polymer layer to cover the deposited powder. The surface of the second conductive polymer layer has irregularities corresponding to the deposited powder. The second conductive polymer layer serves as another part of the solid electrolyte of the capacitor.

10 Claims, 8 Drawing Sheets

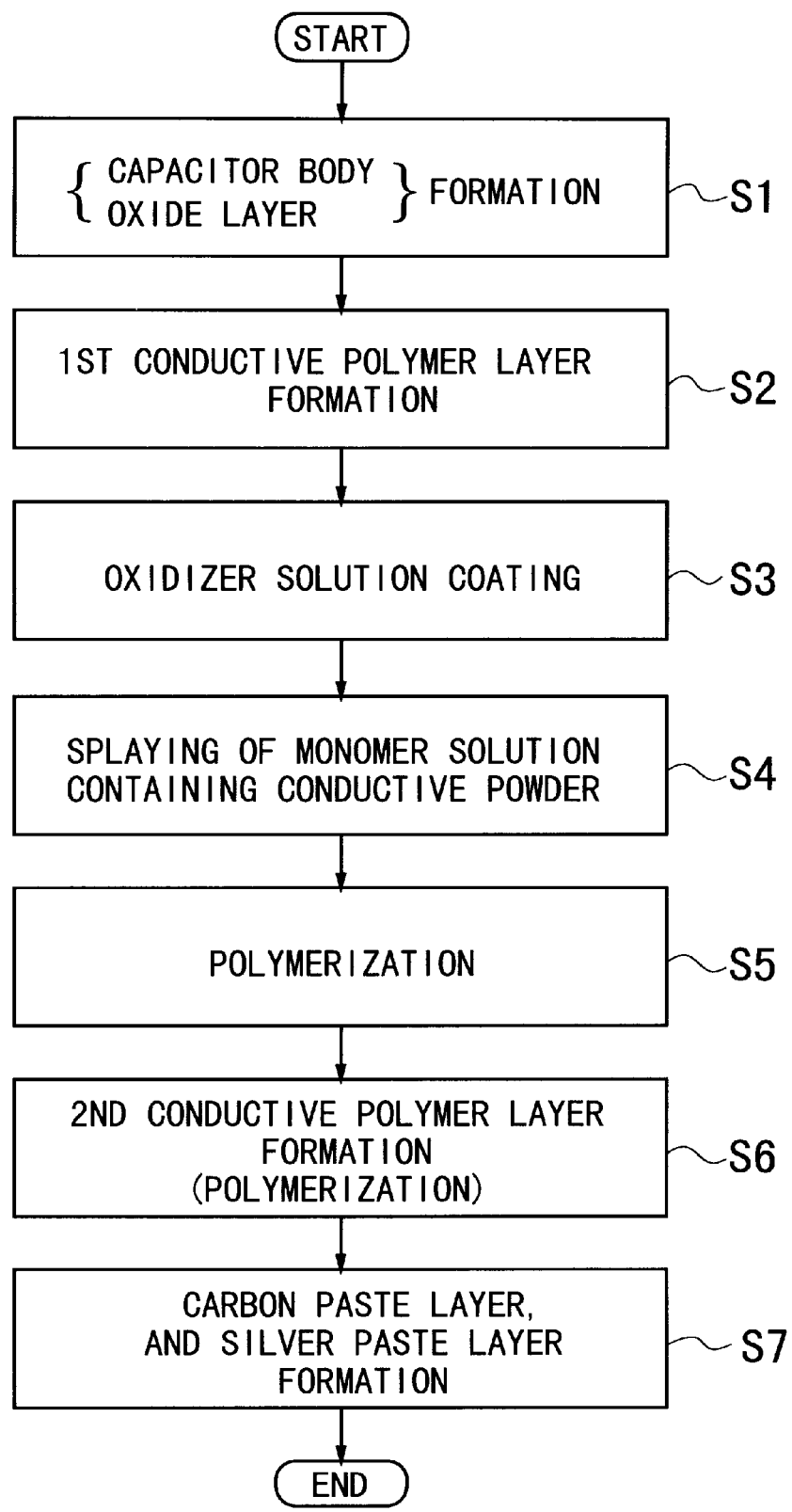

FABRICATION METHOD OF SOLID ELECTROLYTIC CAPACITOR

BACKGROUND OF THE INVENTION

1. Field of the Invention

The present invention relates to a fabrication method of a solid electrolytic capacitor and more particularly, to a fabrication method of a solid electrolytic capacitor using a conductive polymer (for example, polypyrrole, polythiophene, and polyaniline) as a solid electrolyte.

2. Description of the Prior Art

A solid electrolytic capacitor of a chip type has a structure shown in FIG. 1.

In FIG. 1, a porous capacitor body or pellet 2, which is typically made by sintering a powder of a valve metal such as tantalum (Ta) and aluminum (Al), serves as an anode. An oxide layer (not shown), which is formed on the expanded surface of the porous capacitor body 2, serves as a dielectric. A solid electrolyte (not shown), which is formed on the oxide layer, serves as a cathode.

An anode wire 1 is implanted into the top face of the body 2. One end of an anode lead 10 is connected to the anode wire 1.

A conductive layer (not shown) is formed on the solid electrolyte to cover the entire surface of the solid electrolyte. One end of a cathode lead 11 is fixed onto the conductive layer by using a conductive adhesive 9.

The capacitor body 2, the oxide layer, the solid electrolyte, the conductive layer, and the anode wire 1 constitute a capacitor element.

The capacitor element is encapsulated by an epoxy resin package 12 in such a way that the capacitor element and the ends of the anode and cathode leads 10 and 11 are buried in the package 12. The parts of the anode and cathode leads 10 and 11 protruding from the package 12 are bent along the surface of the package 12.

The solid electrolyte has a function of electrically interconnecting the cathode lead with the entire surface of the dielectric formed on the capacitor body 2. Therefore, from this viewpoint, it is desirable that the solid electrolyte is a substance having a high electrical conductivity. On the other hand, the solid electrolyte needs to have a healing function for healing an electrical short due to a defect in the dielectric.

Accordingly, a metal, which has a high electrical conductivity, but has no dielectric healing function, cannot be used as the solid electrolyte. As a result, conventionally, a compound such as manganese dioxide ($MnO_2$) has been used as the solid electrolyte, because $MnO_2$ has a property that it is transformed from a conductor into an insulator due to the heat generated by a short-circuit current.

Further, the solid electrolyte is usually subjected to heat at a temperature as high as 240 to 260° C. during a mounting process of the solid electrolytic capacitor on a mounting board (for example, a printed wiring board). Accordingly, the solid electrolyte needs to have a heat resistance against the heat at a temperature of 260° C. or higher.

The previously-described $MnO_2$ has such a high heat resistance property as above and therefore, it is well suited for use as the solid electrolyte for the solid electrolytic capacitor.

Thus, any material to be used as the solid electrolyte for a solid electrolytic capacitor needs to meet the following three requirements: (i) high electrical conductivity property; (ii) dielectric healing function; and (iii) heat resistance property of 260° C. or higher.

The manganese dioxide that has been favorably used as the solid electrolyte is provided with sufficient properties in the points of (ii) the dielectric healing function and (iii) heat resistance. However, the manganese dioxide has a relatively low electrical conductivity of approximately 0.1 S/cm. Thus, the manganese dioxide cannot be said to be sufficient in the point (i).

Then, in recent years, various capacitors using one of such conductive polymers as polypyrrole, polythiophene, and polyaniline as the solid electrolyte have been vigorously developed. This is because these conductive polymers further have an electrical conductivity as high as 10 to 100 S/cm, which meet the above requirements (i), (ii), and (iii).

Generally, with an electrolytic capacitor utilizing a conductive polymer of this sort, there are three requirements to be met concerning its formation.

A first requirement is that the conductive polymer needs to be formed on the surface of the oxide layer within the pores of the capacitor body 2 with no omission.

A second requirement is that the conductive polymer needs to have a specific thickness or greater on the external surface of the porous body 2.

A third requirement is that good electrical and mechanical connection needs to occur between the layer of the conductive polymer and the conductive layer formed thereon. The conductive layer has, for example, a two-layer structure consisting of a graphite sublayer and a silver paste sublayer located on the graphite sublayer.

To meet the above first and second requirements, the following improved method was developed, which is disclosed in the Japanese Non-Examined Patent Publication No. 63-173313 published in 1988. This improved method includes a first step of forming a first conductive polymer layer as a precoat layer due to chemical polymerization, and a second step of forming a second conductive polymer layer on the precoat layer due to electrolytic polymerization, resulting in a solid electrolyte with a two-layer structure.

The method disclosed in the Japanese Non-Examined Patent Publication No. 63-173313 offers an advantage that the solid electrolyte can be conveniently formed by electrolytic polymerization. However, since the surface of the second conductive polymer layer formed by electrolytic polymerization has a low degree of irregularities, the above third requirement of good electrical and mechanical connection cannot be met with ease.

Another improved method is disclosed in the Japanese Non-Examined Patent Publication No. 4-369819 published in 1992. This method is able to control the thickness of a conductive polymer layer as the solid electrolyte to meet the above second requirement.

With the improved method disclosed in the Japanese Non-Examined Patent Publication No. 4-369819, an oxidizing agent is sprayed toward a porous capacitor body in the formation process of a conductive polymer layer. This method has not only excellent controllability for the thickness of the conductive polymer layer but also an effect of decreasing the amount of the necessary oxidizing agent.

However, with the method of the Japanese Non-Examined Patent Publication No. 4-369819, since no irregularities are formed on the surface of the conductive polymer layer, the third requirement of electrical and mechanical connection is not met.

Thus, either of the above conventional methods disclosed in the Japanese Non-Examined Patent Publication Nos. 63-173313 and 4-369819 leaves room for improvement in the third requirement about the electrical/mechanical connection of the conductive polymer layer with a conductive layer to be formed thereon in a subsequent process.

Then, to solve the above third requirement, a technique of forming a conductive polymer layer was developed, which is disclosed in the Japanese Non-Examined Patent Publication No. 7-94368 published in 1995. With the technique, irregularities are formed on the surface of a conductive polymer layer to thereby increase its surface area, improving the adhesion strength of the conductive polymer layer with a conductive layer to be formed thereon.

FIGS. 2 and 3 are enlarged views of the part A in FIG. 1, respectively, in which, the reference numeral 3 denotes the oxide layer formed to cover the entire surface of the capacitor body 2.

With the method of the Japanese Non-Examined Patent Publication No. 7-94368, a first conductive polymer layer 4 is formed on the oxide layer 3 to bury the fine pores of the body 2, and then, a fine conductive or insulating powder 5 is attached onto the first conductive polymer layer 4. Subsequently, a second conductive polymer layer 6 is formed on the first conductive polymer layer 4 to cover the powder 5, providing irregularities on the surface of the second conductive polymer layer 6.

Alternately, as illustrated in FIG. 3, a first conductive polymer layer 4 is formed on the oxide layer 3 to bury the fine pores of the body 2, and then, a second conductive polymer layer 6 is formed on the first conductive polymer layer 4 in such a way that a fine powder 5 is attached onto the first conductive polymer layer 4.

Following the process of forming the second conductive polymer layer 6, a graphite sublayer 7 and a silver paste sublayer 8, which constitute the conductive layer formed on the solid electrolyte, are successively formed on the second conductive polymer layer 6.

The surface irregularities of the second conductive polymer layer 6 are realized by using a solution in which the fine powder 5 is mixed and dispersed or suspended. Specifically, after forming the first conductive polymer layer 4 on the oxide layer 3, the capacitor body 2 is immersed into a flowing solution in a container where the fine powder 5 is suspended or dispersed in the solution. Thus, the fine powder 5 is deposited on the first polymer layer 4.

Alternately, the fine powder 5 is mixed with a solution of a monomer or a solution of an oxidizing agent in advance. Then, after forming the first conductive polymer layer 4 on the oxide layer 3, the second conductive polymer layer 6 is formed by chemical oxidative polymerization using the solutions of the monomer and the oxidizing agent. During this polymerization process, the fine powder 5 is deposited on the first polymer layer 4.

Further, when the second conductive polymer layer 6 is formed by electrolytic oxidative polymerization, a solution of an electrolyte, in which the fine powder 5 with an electrical conductivity is mixed therewith, is used. The powder 5 is absorbed into the second conductive polymer layer 6 during the electrolytic oxidative polymerization.

By using any one of the three irregularity-formation methods, the irregularities are formed on the surface of the second conductive polymer layer 6, thereby realizing the layer 6 with an adhesion property high enough to meet the above third requirement.

In the above three processes of forming the surface irregularities of the second conductive polymer layer 6 in the method of the Japanese Non-Examined Patent Publication No. 7-94368, it can be said that the solution containing the dispersed fine powder 5 is used while staying in the state of liquid.

With the conventional method disclosed in the Japanese Non-Examined Patent Publication No. 7-94368, the adhesion property (i.e., the electrical and mechanical connection) between the second conductive polymer layer and the graphite sublayer 7 formed thereon can be improved. However, there arises the following problems.

A first problem is that the amount of the fine powder 5 deposited on the first conductive polymer layer 4 tends to greatly change depending upon the speed at which the capacitor body 2 is pulled up from the solution containing the fine powder 5.

A second problem is that the amount of the fine powder deposited on the first conductive polymer layer 4 may greatly fluctuate according to the deposited location of the capacitor body 2. This problem is caused by the fact that the state of dispersion of the fine powder 5 in the solution is unstable.

A third problem is that the amount of the fine powder deposited on the first conductive polymer layer 4 is difficult to be kept unchanged for a long time. This problem is caused by the fact that if the solution containing the fine powder 5 is continuously used, the content of the powder 5 in the solution is decreased. In other words, the degree of the irregularities of the second conductive polymer layer 6 tends to fluctuate with the locations of the body 2, with the bodies 2 processed in the same lot, and with the lots.

The variation or fluctuation of the amount of the deposited fine powder 5 will cause the following disadvantages.

Specifically, if the amount of the deposited powder 5 is too small, the desired degree of the irregularities is not formed on the surface of the second conductive polymer layer 6. Contrarily, if the amount of the deposited powder 5 is too large, the irregularities once formed are canceled finally. As a result, the adhesion strength between the second conductive polymer layer 6 and the graphite sublayer 7 of the conductive layer formed thereon decreases and accordingly, the Equivalent Series Resistance (ESR) and tan δ cannot be satisfactorily decreased by the formation of the irregularities.

SUMMARY OF THE INVENTION

Accordingly, an object of the present invention to provide a fabrication method of a solid electrolytic capacitor that is able to form the surface irregularity of a conductive polymer layer serving as a solid electrolyte with good controllability and good stability.

Another object of the present invention is to provide a fabrication method of a solid electrolytic capacitor that is able to fabricate a solid electrolytic capacitor with high reliability in operation.

The above objects together with others not specifically mentioned will become clear to those skilled in the art from the following description.

A fabrication method of an electrolytic capacitor according to the present invention is comprised of the following steps:
(a) A capacitor body is formed by a valve metal. The body serves as an anode of the capacity. Typically, the body is porous and has opening pores.
(b) An oxide layer is formed to cover the surface of the capacitor body. The oxide layer serves as a dielectric of the capacitor. The oxide layer is typically formed by anodic oxidization of the body.

(c) A first conductive polymer layer is formed on the oxide layer. The first conductive polymer layer serves as a part of a solid electrolyte of the capacitor.

(d) A powder of a conductive polymer is deposited on the first conductive polymer layer.

(e) A second conductive polymer layer is formed on the first conductive polymer layer to cover the deposited powder. The surface of the second conductive polymer layer has irregularities corresponding to the deposited powder. The second conductive polymer layer serves as another part of the solid electrolyte of the capacitor.

The step (d) of depositing the powder of the conductive polymer is performed by spraying a fluid containing the powder on the first conductive polymer.

With the fabrication method of an electrolytic capacitor according to the present invention, the powder of a conductive polymer is deposited by spraying a fluid (i.e., liquid or gas) containing the powder on the first conductive polymer layer. Therefore, the amount of the deposited powder can be kept substantially constant by controlling the amount of the powder in the fluid and the spraying condition. This means that the amount of the deposited powder does not fluctuate according to the deposited location of the capacitor body.

Further, since it is easy to control the amount of the powder contained in the fluid and the spraying condition, the amount of the deposited powder can be kept constant for a long time.

Accordingly, the surface irregularity of the second conductive polymer layer can be formed with good controllability and good stability. This leads to high reliability in operation of a solid electrolytic capacitor.

DETAILED DESCRIPTION OF THE INVENTION

The inventors of the present invention have made a thorough effort to solve the first to third problems previously described in the "Description of the Prior Art". As a result of this, they have found that spraying of a fluid containing the powder of the conductive polymer on the first conductive polymer layer is effective for forming the surface irregularities of the second conductive polymer layer uniformly. The present invention was created based on the knowledge thus found.

Namely, with the fabrication method of a solid electrolytic capacitor according to the present invention, unlike the previously-explained conventional method disclosed in the Japanese Non-Examined Patent Publication No. 7-94368, a fluid (i.e., liquid or gas) containing the powder of the conductive polymer is sprayed ok the first conductive polymer layer in order to form the surface irregularities of the second conductive polymer layer uniformly.

In the present invention, tantalum (Ta), aluminum (Al), niobium (Nb), titanium (Ti), zirconium (Zr), magnesium (Mg), silicon (Si), or the like are preferably used as the valve metal.

The capacitor body is typically in the form of a porous pellet. However, it may be any other form.

For example, the capacitor body is formed by a rolled foil, a sintered powder, or an etched, rolled foil.

The oxide layer is typically formed by anodic oxidization of the capacitor body. However, any other process may be used.

Each of the first and second conductive polymer layers may be preferably formed by a polymer such as a five-membered heterocyclic compound (for example, pyrrole, thiophene, and furan) or its derivative, a six-membered heterocyclic compound (for example, aniline) or its derivative, or a copolymer of the above compound or compounds. However, any other conductive polymer may be used.

The process of forming the first conductive polymer layer in the present invention is not particularly limited. Any process may be used for the formation of the first conductive polymer layer as necessary. However, one of the following processes (i) to (iv) are preferably used.

(i) The porous capacitor body is formed by sintering fine particles of the valve metal, and then, an oxide layer is formed to cover the surface of the body. Subsequently, a solution of a monomer and an oxidizing agent is prepared at a temperature lower than the reaction starting temperature. The solution is introduced into the capacitor body and then, is left in an atmosphere at a temperature higher than the reaction starting temperature to cause an oxidative polymerization reaction of the monomer, thereby forming the first conductive polymer layer.

(ii) The same solution as that of the process (a) is prepared at a temperature lower than the reaction starting temperature. Next, the solution is applied or coated on the oxide layer of the capacitor body. The coated solution is then dried at a temperature higher than the reaction starting temperature to cause an oxidative polymerization reaction of the monomer, thereby forming the first conductive polymer layer.

(iii) The first conductive polymer layer is formed by electrolytic polymerization.

(iv) The porous capacitor body with the oxide layer is formed by the same process as that of (i). Subsequently, an oxidizing agent as it is or dissolved in an appropriate solvent is introduced into the porous capacitor body. Then, the oxidizing agent is contacted with a monomer itself of a conductive polymer, or its solution, or its vaporized gas, thereby forming the first conductive polymer layer.

The powder of the conductive polymer, which is used for forming the irregularities of the second conductive polymer layer, is not particularly limited in the point of a fabrication method. In other words, it may be a powder obtained by any method. Preferably, the powder is obtained by a chemical polymerization process with the use of an oxidizing agent, by powdering a layer of a conductive polymer formed by an electrolytic polymerization process.

The shape of the particles of the powder also is not limited. For example, the powder may consist of spherical particles, flat ones, needle-like ones, or a mixture of these particles.

However, if the particle diameter of the powder is too small, the surface of the second conductive polymer layer cannot be made sufficiently irregular. Contrarily, if the particle diameter thereof is too large, there arises a problem that the second conductive polymer layer is formed too thick. Therefore, a proper range of the particle diameter of the powder is 1 $\mu$m to 20 $\mu$m. Especially, it is desirable that the particle diameter is in the range from 2 $\mu$m to 10 $\mu$m.

In a preferred embodiment of the present invention, the step (d) of depositing the powder of the conductive polymer is performed by (d-1) mixing the powder of the conductive polymer with a solution of the conductive polymer; and (d-2) spraying the solution containing the powder on the surface of the first conductive polymer, thereby depositing the powder on the surface of the first conductive polymer.

In this case, as the solution of the conductive polymer, any solution may be used. Specifically, any solution consisting of a water or organic solvent and a conductive polymer dissolved or stably suspended therein may be used.

For example, a solution of chloroform, benzene, or THF (tetrahydrofuran) in which poly(3-methylpyrole), poly(N-methylpyrrole), or other substituted polypyrrole is dissolved; a solution of NMP (N-methylpyrrolidone), DMF (dimethylformaldehyde), and DMSO (dimethylsulfoxide) in which polyaniline is dissolved; or an aqueous solution in which poly(sulfonated aniline) is dissolved may be used.

In another preferred embodiment of the present invention, the step (d) of depositing the powder of the conductive polymer is performed by (d-1) mixing the powder of the conductive polymer with a solution of an oxidizing agent of the conductive polymer; and (d-2) spraying the solution containing the powder on the surface of the first conductive polymer; and (d-3) applying a solution of a monomer to the surface of the first conductive polymer to chemically polymerizing the monomer using the oxidizing agent, thereby depositing the powder on the surface of the first conductive polymer.

In still another preferred embodiment of the present invention, the step (d) of depositing the powder of the conductive polymer is performed by (d-1) mixing the powder of the conductive polymer with a solution of a monomer, (d-2) spraying the solution containing the powder on the surface of the first conductive polymer; and (d-3) applying a solution of an oxidizing agent to the surface of the first conductive polymer layer to chemically polymerizing the monomer using the oxidizing agent, thereby depositing the powder on the surface of the first conductive polymer.

In a further preferred embodiment of the present invention, the step (d) of depositing the powder of the conductive polymer is performed by (d-1) applying a solution of a monomer to the surface of the first conductive polymer layer; (d-2) mixing the powder of the conductive polymer with a solution of an oxidizing agent; and (d-3) spraying the solution containing the powder on the surface of the first conductive polymer to chemically polymerizing the monomer using the oxidizing agent, thereby depositing the powder on the surface of the first conductive polymer.

In a still further preferred embodiment of the present invention, the step (d) of depositing the powder of the conductive polymer is performed by (d-1) applying a solution of an oxidizing agent to the surface of the first conductive polymer layer; (d-2) mixing the powder of the conductive polymer with a solution of a monomer; and (d-3) spraying the solution containing the powder on the surface of the first conductive polymer to chemically polymerizing the monomer using the oxidizing agent, thereby depositing the powder on the surface of the first conductive polymer.

In the above cases, as a supporting electrolyte used for forming the second conductive polymer layer by electrolytic polymerization, any supporting electrolyte may be used.

For example, as the anion, (i) a halogenated anion such as hexafluorophosphorus, hexafluoroarsenic, and tetrafluoroboron; (ii) a halogen anion such as iodine, bromine, and chlorine; (iii) a perchloric acid anion; (iv) an alkyl sulfonic acid such as methyl sulfonic acid; or (v) an aromatic sulfonic acid such as alkylbenzenesulfonic acid, nitrobenzenesulfonic acid, aminobenzenesulfonic acid, benzednesulfonic acid, benzenedisulfonic acid and β-naphthalenesulfonic acid may be used.

As the cation, (i) an alkali metal such as lithium, sodium, and potassium; or (ii) a Class-4 ammonium cation such as ammonium, tetraethyl ammonium, and tetrabuthyl ammonium may be used.

As the oxidizing agent used for forming the second conductive polymer layer by chemical polymerization, any oxidizing agent may be used.

For example, (i) a halogen such as iodine, bromine, and chlorine; (ii) a metallic halide such as arsenic pentafluoride, antimony pentafluoride, silicon tetrafluoride, phosphorus pentoxide, phosphorus pentafluoride, aluminum chloride, molybdenum chloride, ferric chloride, and cupric chloride; (iii) a proton such as sulfuric acid, nitric acid, fluorosulfuric acid, trifluorometane sulfuric acid, and chlorosulfuric acid; (iv) an oxygen-containing compound such as sulfur trioxide and nitrogen dioxide; (v) a persulfate such as ammonium persulfate, sodium persulfate, and potassium persulfate; (vi) a permanganate such as potassium permanganate, sodium permanganate, and ammonium permanganate; (vii) a nichromate such as potassium nichromate, sodium nichromate, and aluminum nichromate: (viii) a peroxide such as hydrogen peroxide, and peracetic acid; (iX) a metallic alkylsulfonate such as ferric methylsulfonate, and cupric methylsulfonate; or (x) a metallic aromatic sulfonate such as ferric toluensulfonate, ferric benzenesulfonate, ferric benzenedisulfonate, cupric toluensulfonate, and cupric benzenesulfonate may be used.

BRIEF DESCRIPTION OF THE DRAWINGS

In order that the invention may be readily carried into effect, it will now be described with reference to the accompanying drawings.

FIG. 9 is a flowchart showing the process sequence of a fabrication method of a solid electrolytic capacitor according to a twelfth example of the present invention.

EXAMPLES

Figure 1:
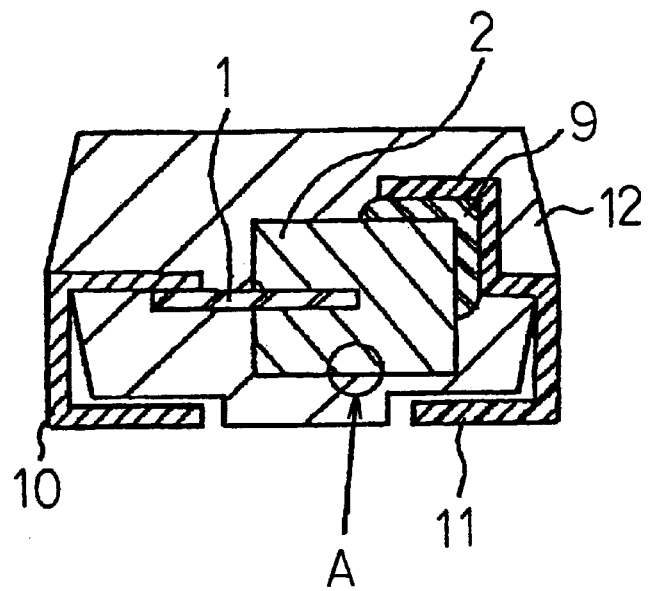
FIG. 1 is a cross-sectional view of a conventional chip-type solid electrolytic capacitor, which shows the structure of the capacitor.
Figure 2:
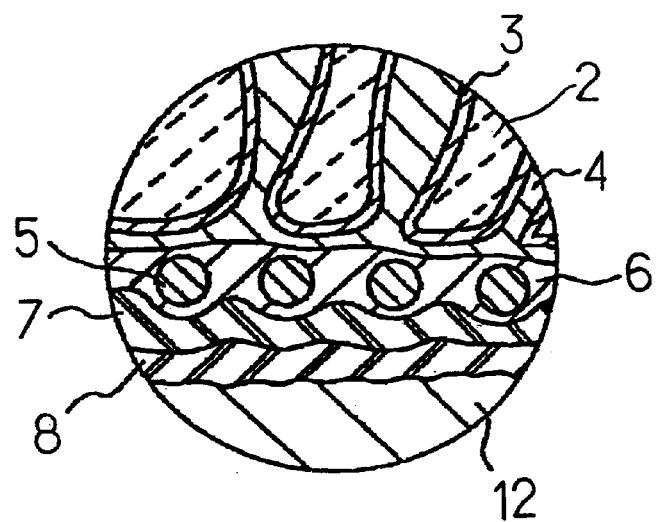
FIG. 2 is an enlarged cross-sectional view of the position A in FIG. 1, which shows a configuration of the irregularities of a second conductive polymer layer.
Figure 3:
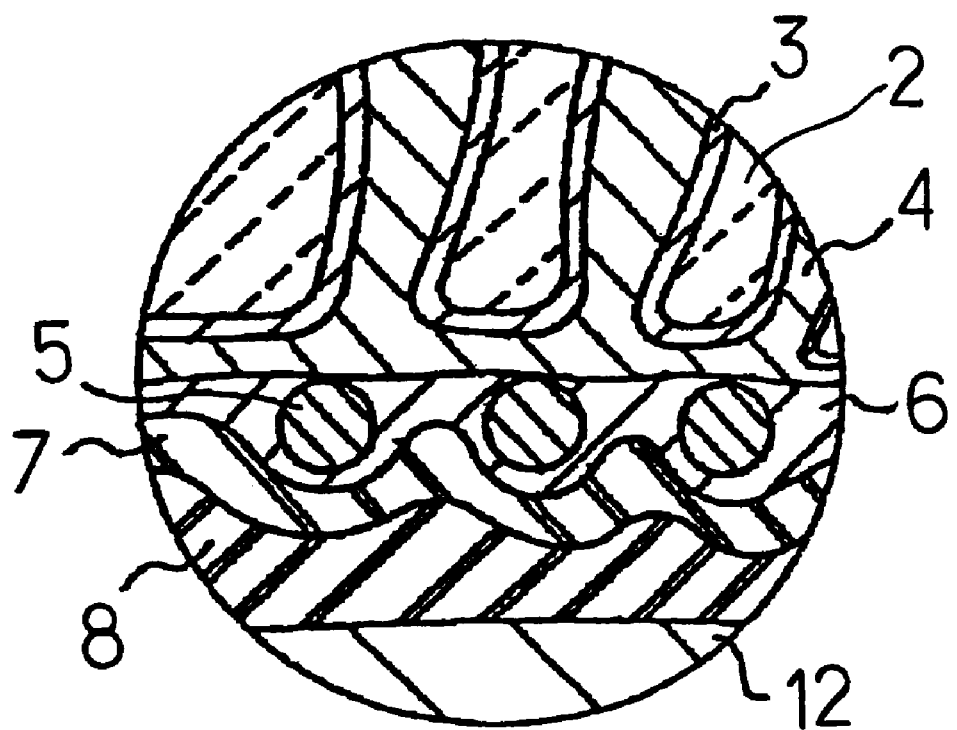
FIG. 3 is an enlarged cross-sectional view of the position A in FIG. 1, which shows another configuration of the irregularities of a second conductive polymer layer.

Preferred examples of the present invention and a comparative example will be described below referring to the drawings attached.

FIRST EXAMPLE

Figure 4:
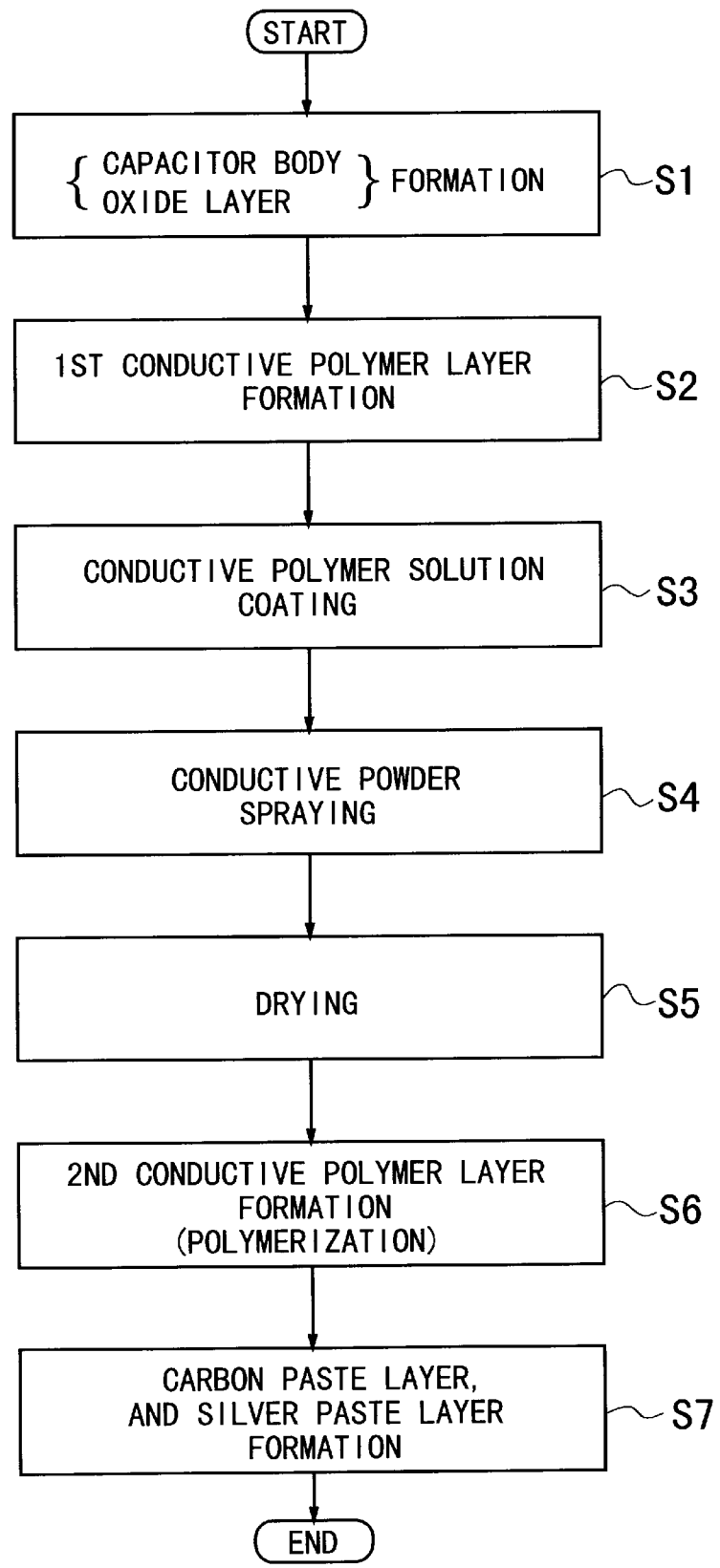
FIG. 4 is a flowchart showing the process sequence of a fabrication method of a solid electrolytic capacitor according to first to fourth examples of the present invention.

As shown in FIG. 4, first, a columnar tantalum pellet or capacitor body 2 with a length of 1 mm and a height of 1 mm was prepared by a sintering process (step S1). The sintered pellet 2 had a porosity of approximately 70%. An anode wire 1 was implanted into the top face of the pellet 2 during the sintering process.

Then, the pellet 2 was anodic-oxidized at a voltage of 20 V in a 0.05% nitric acid solution, thereby forming a tantalum oxide layer 3 serving as a dielectric on the surface of the pellet 2 (step S1). The capacitance value of this pellet 2, which was measured in a sulfuric acid solution, was 10.5 F at a frequency of 120 Hz.

Next, by the method as disclosed in the previously-described Japanese Non-Examined Patent Publication No. 63-173313, a first conductive polymer layer 4, which was made of polypyrrole, was formed on the tantalum oxide layer 3 on the pellet 2 (step S2).

Further, the sintered pellet 2 was immersed in an NMP (N-methyl-2-pyrrolidone) solution of polyaniline to thereby coat the first conductive polymer layer 4 with an N-methylpyrrole solution (step S3).

A fine powder 5 of polypyrrole having a particle diameter of 5 $\mu$m, which had been previously prepared by chemical polymerization, was sprayed on the coated first conductive polymer layer 4 by a compressed air with a pressure of 1.5 kg/cm$^2$ (step S4).

Then, the capacitor body 2 was dried at a temperature of 150° C. for 30 minutes, thereby removing the NMP (step S5). These immersing, spraying, and drying steps were repeated two times. Thus, the fine powder of polypyrrole was applied onto the surface of the first conductive polymer layer 4.

Subsequently, the sintered pellet 2 was immersed in an aqueous solution consisting of 0.01-mole pyrrole, 0.01-mole oxalic acid, and 0.03-mole tetrabutyl ammonium toluensulfonate. The surface of the pellet 2 was contacted with an auxiliary electrode in this aqueous solution. Then, the pyrrole contained in the solution was electrolytically polymerized while supplying a constant current of 0.2 mA/cm$^2$, thereby forming a second conductive polymer layer 6 made of polypyrrole (step S6).

Thereafter, a carbon paste layer 7 and a silver paste layer 8 were formed in sequence on the second conductive polymer layer 6 by popular processes, thereby completing a capacitor element (step S7).

Further, an anode lead terminal 10 was welded to the anode wire 1, and a cathode lead 11 was bonded to the silver paste layer 8 with a conductive adhesive 9. Finally, the assembly was encapsulated by an epoxy resin to form a plastic package 12. Thus, a chip-type tantalum solid electrolytic capacitor was finished.

SECOND EXAMPLE

As shown in FIG. 4, through the same process steps S1 to S5 as those in the first example, a fine powder 5 of polypyrrole was applied onto the surface of the first conductive polymer layer 4.

Subsequently, the sintered pellet 2 was immersed in a butanol solution of 50% ferric toluensulfonate and left at room temperature for 30 minutes. Then, it was immersed in pyrrole and left at room temperature for 30 minutes to thereby chemically polymerize the pyrrole, resulting in a polypyrrole layer on the surface of the first conductive polymer layer 4. Further, the pellet 2 was immersed in a methanol solution and left at room temperature for 30 minutes for the purpose of washing or cleaning. These process steps were repeated three times to form a second conductive polymer layer 6 made of polypyrrole on the first conductive polymer layer 4 (step S6).

Thereafter, in the same manner as that in the first example, a chip-type solid electrolyte capacitor was completed.

THIRD EXAMPLE

As shown in FIG. 4, in the same manner as that in the first example, a first conductive polymer layer 4, which was made of polyaniline, was formed on an oxide layer 3 of a sintered pellet 2 by using the method as disclosed in the Japanese Non-Examined Patent Publication No. 63-173313 (steps S1 and S2).

Next, the sintered pellet 2 was immersed in an NMP solution of polyaniline to coat be coated with a polyaniline solution (step S3).

Then, a fine powder 5 of polyaniline with a particle diameter of 5 $\mu$m, which was previously prepared by chemical polymerization, was sprayed to the coated first conductive polymer layer 4 by a compressed air at a pressure of 1.5 kg/cm$^2$ (step S4). The NMP applied on the layer 4 was then removed by drying the pellet 2 at a temperature of 150° C. for 30 minutes (step S5). These process steps were repeated two times, thereby adhering a fine powder 5 of polyaniline onto the surface of the first conductive polymer layer 4.

Then, the sintered pellet 2 was immersed in a sulfuric acid solution of 0.1-mole aniline, and an auxiliary electrode was contacted with the pellet 2. Further, the aniline was electrolytically polymerized by a scanning potential method of –0.1 to 1.2 V (with respect to a saturation calomel electrode) and 1 Hz, thereby forming a second conductive polymer layer 6 made of polyaniline (step S6).

Thereafter, in the same manner as that in the first example, a chip-type solid electrolyte capacitor was completed.

FOURTH EXAMPLE

As shown in FIG. 4, in the same manner as that in the third example, a first conductive polymer layer 4, which was made of polyaniline, was formed on the oxide layer 3 (steps S1 and S2), and then, a fine powder 5 of polypyrrole was applied onto a conductive polymer layer 4 (steps S3 to S5).

Next, a sintered pellet 2 was immersed in a butanol solution of 50% ferric toluensulfonate and was left at room temperature for 30 minutes. Then, the sintered pellet 2 was immersed in aniline and was left at room temperature for 30 minutes to thereby chemically polymerize the aniline. Further, the pellet 2 was immersed in water and left at room temperature for 30 minutes for the purpose of washing. These process steps were repeated five times to thereby form a second conductive polymer layer 6 made of polyaniline (step S6).

Thereafter, in the same manner as that in the first example, a chip-type solid electrolyte capacitor was completed.

FIFTH EXAMPLE

Figure 5:
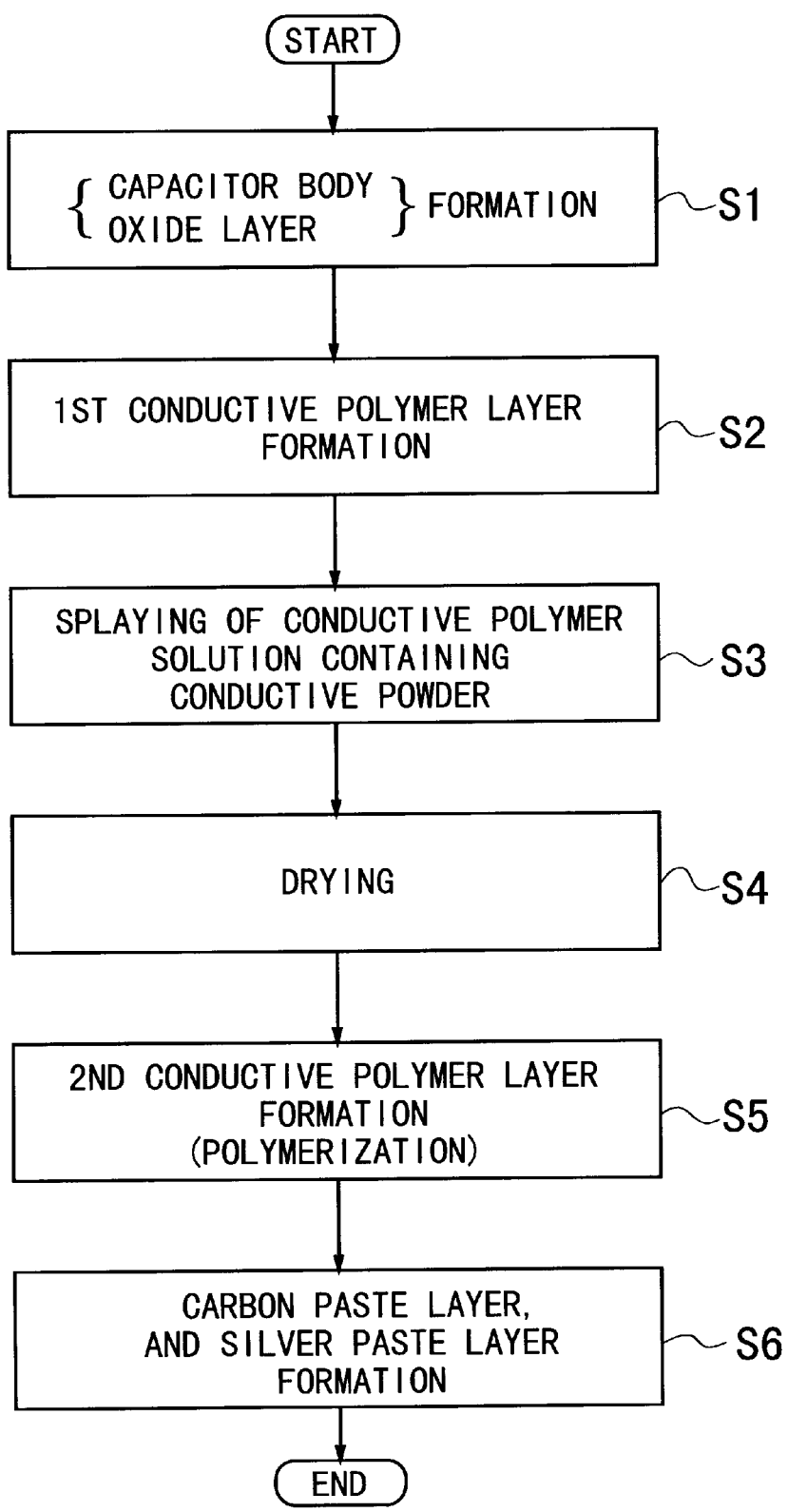
FIG. 5 is a flowchart showing the process sequence of a fabrication method of a solid electrolytic capacitor according to fifth and sixth examples of the present invention.

As shown in FIG. 5, in the same manner as that in the first example, a first conductive polymer layer 4, which was made of polypyrrole, was formed on the oxide layer 3 (steps S1 to 2).

Next, a fine powder 5 of polypyrrole with a particle diameter of 5 $\mu$m, which was previously generated by chemical polymerization, was mixed with an NMP solution of polyaniline. The mixed solution was then sprayed on the first conductive polymer layer 4 by a compressed air with a pressure of 2.0 kg/cm$^2$ (step S3). The NMP on the pellet 2 was removed by drying the pellet 2 at a temperature of 150° C. for 30 minutes (step S4). These process steps were repeated two times to adhere the fine powder 5 of polypyrrole to the first conductive polymer layer 4.

Subsequently, the sintered pellet 2 was immersed in an acetonitrile solution of 0.01-mole pyrrole and 0.03-mole tetrabutyl ammonium perchlorate, and an auxiliary electrode was contacted on the pellet 2. The pyrrole was electrolytically polymerized with a constant current of 0.2 mA/cm$^2$ to thereby form a second conductive polymer layer 6 on the first conductive polymer layer 4 (step S5).

Thereafter, in the same manner as that in the first example, a chip-type solid electrolyte capacitor was completed.

SIXTH EXAMPLE

As shown in FIG. 5, in the same manner as that in the first example, a first conductive polymer layer 4, which was made of polypyrrole, was formed on the oxide layer 3 (steps S1 to 2).

Next, a fine powder 5 of polypyrrole with a particle diameter of 5 μm, which was previously generated by chemical polymerization, was mixed with an NMP solution of polyaniline. The mixed solution was then sprayed on the first conductive polymer layer 4 by a compressed air with a pressure of 2.0 kg/cm$^2$ (step S3). The NMP on the pellet 2 was removed by drying the pellet 2 at a temperature of 150° C. for 30 minutes (step S4). These process steps were repeated two times to adhere the fine powder 5 of polypyrrole to the first conductive polymer layer 4.

Further, the sintered pellet 2 was immersed in a methanol solution of 50% ferric dodecylbenzenesulfonate and was left at room temperature for 30 minutes. Then, the pellet 2 was immersed in pyrrole and was left at room temperature for 30 minutes to thereby chemically polymerize the pyrrole. Further, the pellet 2 was immersed in a methanol solution, being left at room temperature for 30 minutes for washing. These process steps were repeated five times to thereby form a second conductive polymer layer 6 made of polypyrrole (step S5).

Thereafter, in the same manner as that in the first example, a chip-type solid electrolyte capacitor was completed.

SEVENTH EXAMPLE

Figure 6:
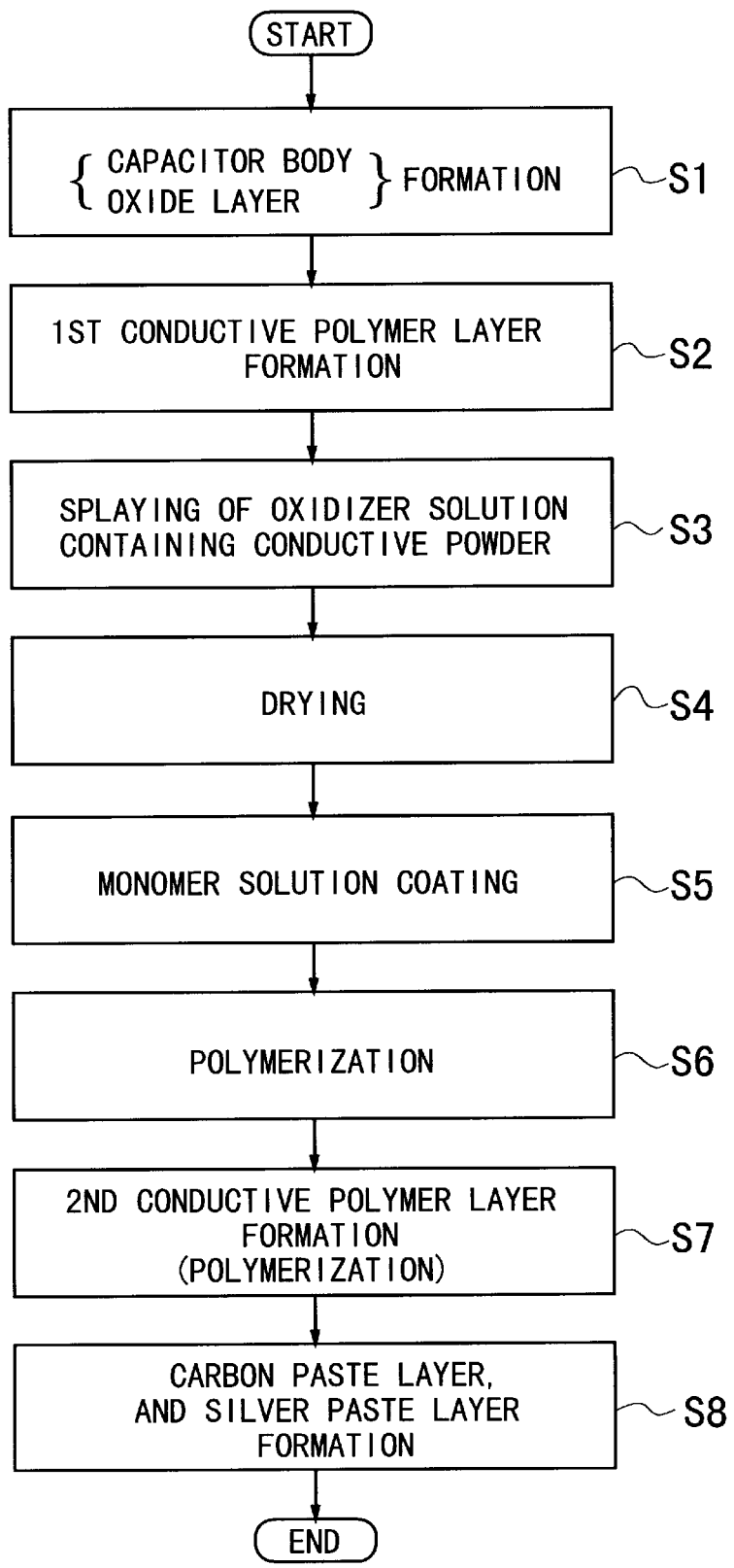
FIG. 6 is a flowchart showing the process sequence of a fabrication method of a solid electrolytic capacitor according to seventh and eighth examples of the present invention.

As shown in FIG. 6, in the same manner as that in the first example, a first conductive polymer layer 4, which was made of polypyrrole, was formed on the oxide layer 3 (steps S1 to 2).

Next, a fine powder 5 of polypyrrole with a particle diameter of 5 μm, which was previously generated by chemical polymerization, was mixed with a butanol solution of 50% ferric toluensulfonate serving as an oxidizing agent. Then, the mixed solution was sprayed on the first conductive polymer layer 4 formed on the sintered pellet 2 by a compressed air with a pressure of 2.0 kg/cm$^2$ (step S3). Subsequently, the pellet 2 was dried at room temperature for 30 minutes (step S4). These process steps were repeated two times to temporarily bond the fine powder 5 of polypyrrole to the first conductive polymer layer 4.

Further, the pellet 2 was immersed in pyrrole (step S5), and then, it was left at room temperature for 30 minutes, thereby chemically polymerizing the pyrrole (step S6). At the same time, the fine powder 5 of polypyrrole 5 thus generated was adhered onto the first conductive polymer layer 4.

Subsequently, the pellet 2 was immersed in an acetonitrile solution of 0.01-mole pyrrole and 0.03-mole sodium toluenesulfonate, and then, an auxiliary electrode was contacted with the surface of the pellet 2. Following this, the pyrrole was electrolytically polymerized with a constant current of 0.3 mA/cm$^2$, thereby forming a second conductive polymer layer 6 made of polypyrrole on the first conductive polymer layer 4 (step S7).

Thereafter, in the same manner as that in the first example, a chip-type solid electrolyte capacitor was completed.

EIGHTH EXAMPLE

As shown in FIG. 6, in the same manner as that in the first example, a first conductive polymer layer 4, which was made of polypyrrole, was formed on the oxide layer 3 (steps S1 to 2).

Then, a fine powder 5 of polypyrrole with a particle diameter of 5 μm, which was previously generated by chemical polymerization, was mixed with a butanol solution of 50% ferric toluensulfonate serving as an oxidizing agent. Then, the mixed solution was sprayed on the first conductive polymer layer 4 formed on the sintered pellet 2 by a compressed air with a pressure of 2.0 kg/cm$^2$ (step S3). Subsequently, the pellet 2 was dried at room temperature for 30 minutes (step S4). These process steps were repeated two times to temporarily bond the fine powder 5 of polypyrrole to the first conductive polymer layer 4.

Further, the pellet 2 was immersed in pyrrole (step S5) and was left at room temperature for 30 minutes, thereby chemically polymerizing the pyrrole (step S6). At the same time, the fine powder 5 of polypyrrole thus generated was adhered onto the first conductive polymer layer 4.

Next, the sintered pellet 2 was immersed in a methanol solution of 50% ferric dodecylbenzenesulfonate, and was left at room temperature for 30 minutes. Then, the pellet 2 was immersed in pyrrole and was left at room temperature for 30 minutes, thereby chemically polymerizing the pyrrole.

Further, the pellet 2 was immersed in a methanol solution and was left at room temperature for 30 minutes for washing. These process steps were repeated five times to thereby form a second conductive polymer layer 6 made of polypyrrole on the first conductive polymer layer 4 (step S7).

Thereafter, in the same manner as that in the first example, a chip-type solid electrolyte capacitor was completed.

NINTH EXAMPLE

Figure 7:
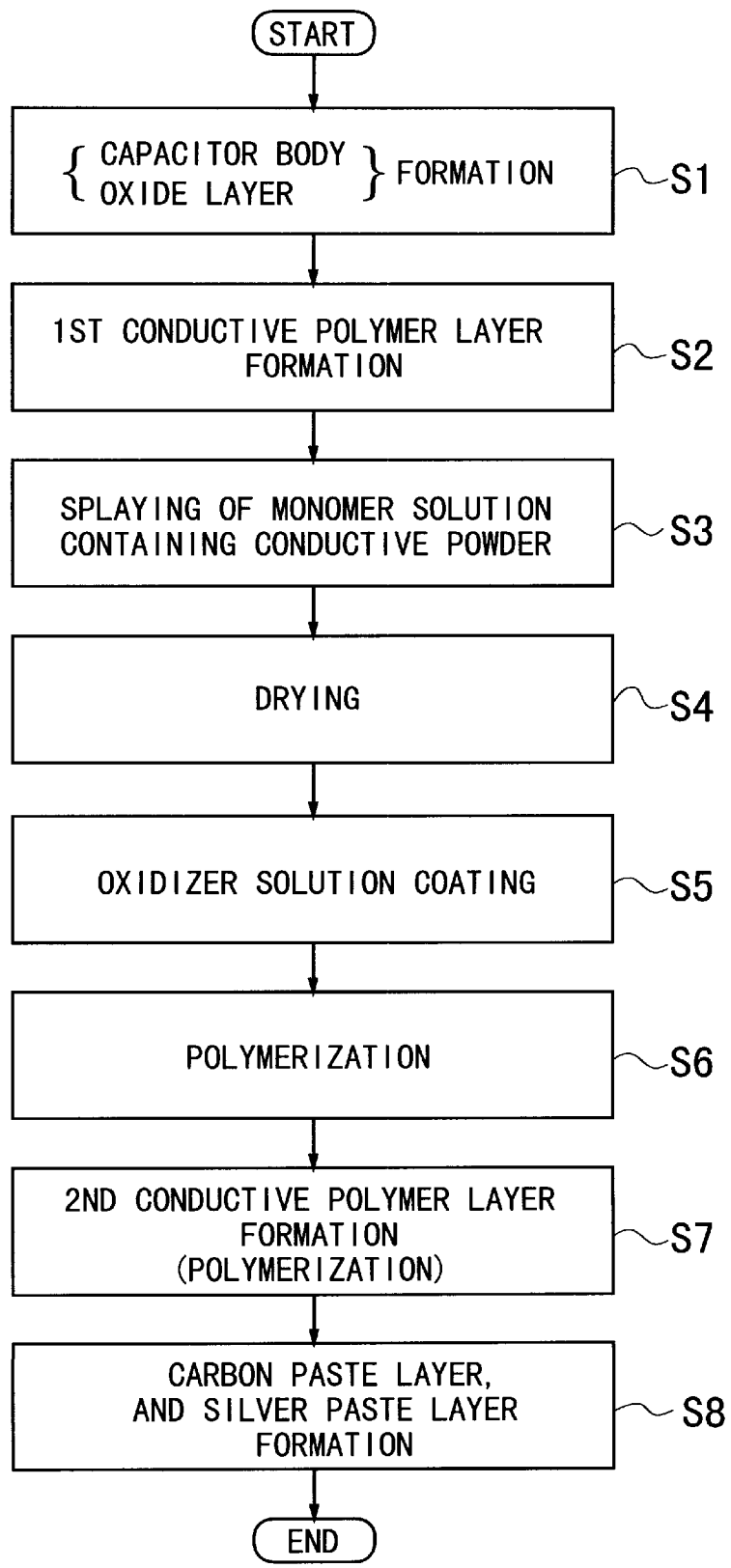
FIG. 7 is a flowchart showing the process sequence of a fabrication method of a solid electrolytic capacitor according to ninth and tenth examples of the present invention.

As shown in FIG. 7, in the same manner as that in the first example, a first conductive polymer layer 4, which was made of polyaniline, was formed on the oxide layer 3 (steps S1 to 2).

Then, a fine powder 5 of polyaniline with a particle diameter of 5 μm, which was previously generated by chemical polymerization, was mixed with a methanol solution of 50% aniline. The solution was then sprayed on the first conductive polymer layer 4 formed on the sintered pellet 2 by a compressed air with a pressure of 1.5 kg/cm$^2$ (step S3). Subsequently, the pellet 2 was dried at room temperature for 30 minutes (step S4). These process steps were repeated two times to temporarily bond the fine powder 5 of polyaniline to the first conductive polymer layer 4.

Further, the pellet 2 was immersed in an aqueous solution of 0.05-mole ammonium chromate and 0.05-mole paratoluenesulfonate, and was left at room temperature for 30 minutes, thereby chemically polymerizing the aniline (step S6). At the same time, the fine powder 5 of polyaniline thus generated was adhered onto the first conductive polymer layer 4.

Next, the sintered pellet 2 was immersed in a sulfuric acid solution of 0.1-mole aniline, and then, an auxiliary electrode was contacted with the pellet 2. The aniline was electrolytically polymerized by a scanning potential method of −0.1 to 1.2 V (with respect to the saturation calomel electrode) and at 1 Hz, thereby forming a second conductive polymer layer 6 made of polyaniline on the first conductive layer 4 (step S7).

Thereafter, in the same manner as that in the first example, a chip-type solid electrolyte capacitor was completed.

TENTH EXAMPLE

As shown in FIG. 7, in the same manner as that in the first example, a first conductive polymer layer 4, which was made of polypyrrole, was formed on the oxide layer 3 (steps S1 to 2).

Next, a fine powder 5 of polyaniline with a particle diameter of 5 μm, which was previously generated by chemical polymerization, was mixed with a methanol solution of 50% aniline. The solution was then sprayed on the first conductive polymer layer 4 formed on the sintered pellet 2 by a compressed air with a pressure of 1.5 kg/cm$^2$ (step S3). Subsequently, the pellet 2 was dried at room temperature for 30 minutes (step S4). These process steps were repeated two times to temporarily bond the fine powder 5 of polyaniline to the first conductive polymer layer 4.

Further, the pellet 2 was immersed in a butanol solution of 50% ferric dodecylbenzenesulfonate serving as an oxidizing agent (step S5), and was left at room temperature for 30 minutes, thereby chemically polymerizing the aniline (step S6). At the same time, the fine powder 5 of polyaniline thus generated was adhered onto the first conductive polymer layer 4.

Next, the sintered pellet 2 was immersed in a methanol solution of 50% ferric dodecylbenzenesulfonate, and was left at room temperature for 30 minutes. Then, the pellet 2 was immersed in pyrrole, and was left at room temperature for 30 minutes, chemically polymerizing the pyrrole. Further, the pellet 2 was immersed in a methanol solution, and was left at room temperature for 30 minutes for washing. These process steps were repeated five times to form the second conductive high polymer layer 6 made of polypyrrole (step S7).

Thereafter, in the same manner as that in the first example, a chip-type solid electrolyte capacitor was completed.

ELEVENTH EXAMPLE

Figure 8:
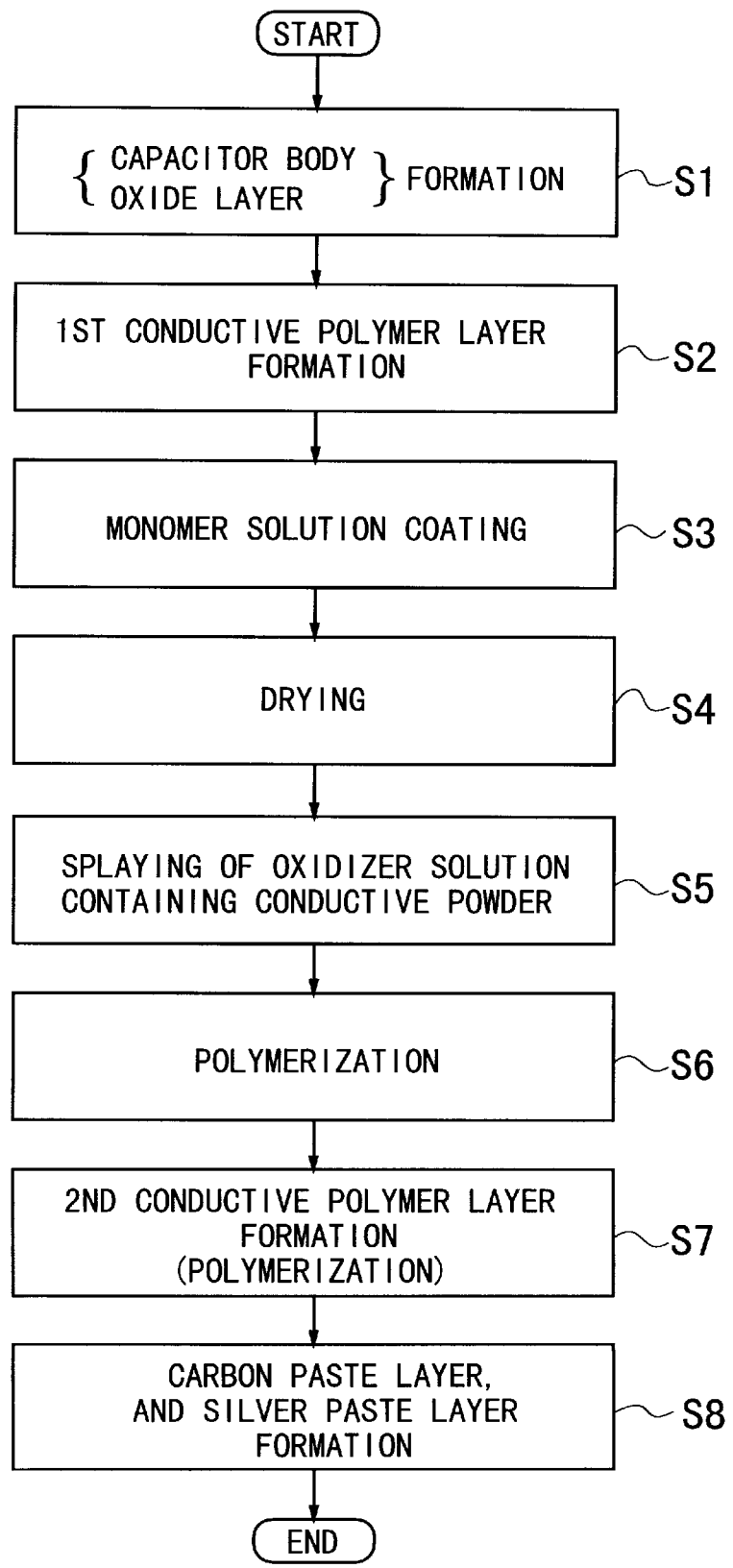
FIG. 8 is a flowchart showing the process sequence of a fabrication method of a solid electrolytic capacitor according to an eleventh example of the present invention.

As shown in FIG. 8, in the same manner as that in the first example, a first conductive polymer layer 4, which was made of polypyrrole, was formed on the oxide layer 3 (steps S1 to 2).

Then, the pellet 2 was immersed in a methanol solution of 50% pyrrole (step S3), and then, it was dried at room temperature for 30 minutes (step S4).

Next, a fine powder 5 of polypyrrole with a particle diameter of 5 μm, which was previously generated by chemical polymerization, was mixed with a methanol solution of 50% ferric toluensulfonate serving as an oxidizing agent. The solution was then sprayed on the first conductive polymer layer 4 formed on the sintered pellet 2 by a compressed air with a pressure of 2.0 kg/cm$^2$ (step S5). Subsequently, the pellet 2 thus sprayed was dried at room temperature for 30 minutes. These process steps were repeated two times to polymerize the pyrrole (step S6) and at the same time, to temporarily bond the fine powder 5 of polypyrrole to the first conductive polymer layer 4.

Further, the pellet 2 was immersed in pyrrole, and was left at room temperature for 30 minutes, thereby chemically polymerizing the pyrrole and, at the same time, adhere the fine powder 5 of polypyrrole onto the first conductive polymer layer 4.

Following this, the sintered pellet 2 was immersed in a methanol solution of 50% ferric dodecylbenzenesulfonate, and was left at room temperature for 30 minutes. Then, the pellet 2 was immersed in pyrrole, and was left at room temperature for 30 minutes, thereby chemically polymerizing the pyrrole. Further, the pellet 2 was immersed in a methanol solution, and was left at room temperature for 30 minutes for cleaning. These process steps were repeated five times to form the second conductive polymer layer 6 made of polypyrrole on the first conductive polymer layer 4 (step S7).

Thereafter, in the same manner as that in the first example, a chip-type solid electrolyte capacitor was completed.

TWELFTH EXAMPLE

As shown in FIG. 9, in the same manner as that in the first example, a first conductive polymer layer 4, which was made of polypyrrole, was formed on the oxide layer 3 (steps S1 to 2).

Then, the sintered pellet 2 was immersed in a methanol solution of 50% ferric dodecylbenzenesulfonate serving as an oxidizing agent, and was left at room temperature for 30 minutes (step S3).

Subsequently, a fine powder 5 of polyaniline with a particle diameter of 5 μm, which was previously generated by chemical polymerization, was mixed with a pyrrole solution. The solution was then sprayed on the first conductive polymer layer 4 formed on the sintered pellet 2 by a compressed air with a pressure of 1.5 kg/cm$^2$ (step S4). Subsequently, the pellet 2 thus sprayed was left at room temperature for 30 minutes. These process steps were repeated two times to thereby polymerize the pyrrole (step S5) and at the same time, to temporarily bond the fine powder 5 of polypyrrole to the first conductive polymer layer 4.

Next, the sintered pellet 2 was immersed in a methanol solution of 50% ferric dodecylbenzenesulfonate, and was left at room temperature for 30 minutes. Then, the pellet 2 was immersed in pyrrole, and was left at room temperature for 30 minutes, thereby chemically polymerizing the pyrrole. Further, the pellet 2 was immersed in a methanol solution, and was left at room temperature for 30 minutes for cleaning. These process steps were repeated five times to thereby form a second conductive polymer layer 6 made of polypyrrole on the first conductive polymer layer 4 (step S6).

Thereafter, in the same manner as that in the first example, a chip-type solid electrolyte capacitor was completed.

COMPARATIVE EXAMPLE

On the basis of the previously-explained conventional fabrication method disclosed in the Japanese Non-Examined Patent Publication No. 7-94368, a chip-type tantalum solid electrolytic capacitor was prepared in the following way.

First, in the same manner as that in the first example, a first conductive polymer layer 4, which was made of polypyrrole, was formed on the oxide layer 3.

Then, the sintered pellet 2 was immersed in a methanol solution of 40% ferric toluenesulfonate, and was left at room temperature for 30 minutes. The pellet 2 was then immersed in a methanol solution of 10% pyrrole with which a fine powder 5 of polypyrrole with a particle diameter of 5 μm was mixed by 5%, and was left at room temperature for 30 minutes, thereby polymerizing the pyrrole. The fine powder 5 of polypyrrole was previously generated by chemical polymerization.

Thereafter, the sintered pellet 2 was further immersed in a methanol solution at room temperature for 30 minutes for cleaning. These process steps were repeated three times to thereby form a layer of polypyrrole including the fine powder 5 of polypyrrole on the first conductive polymer layer 4. The layer of polypyrrole thus formed serves as a second conductive polymer layer 6.

Thereafter, in the same manner as that in the first example, a chip-type solid electrolyte capacitor was completed.

TESTS

For the chip-type tantalum solid electrolytic capacitors obtained by the above first to twelfth examples according to the present invention and the comparative example, the degree of surface irregularities of the second conductive polymer layer 6, the capacitance value C, the tan δ, and the ESR were measured.

Further, thermal shock tests were conducted to determine the degree of change in tan δ and ESR before and after the thermal shock tests. The values of C and tan δ are those at 120 Hz, and the values of ESR are those at 100 kHz. The thermal shock tests were conducted under the conditions that the temperature was changed from −55° C. to +105° C. and the number of cycles was 100.

The results of the measurements are shown in the following Table 1.

layer 6 is at least 10 μm for the first to twelfth examples of the invention, while it is as low as 2 μm for the comparative example.

Therefore, it can be said that the difference in degree of deterioration of the electrical characteristics before and after the thermal shock test between the first to twelfth examples of the invention and the comparative example is due to the difference in degree of the surface irregularities of the second conductive polymer layer 6.

In other words, with the conventional fabrication method corresponding to the comparing example, it is difficult to control the surface irregularities, resulting in the impossibility of forming the irregularities of an appropriate size. Also, the adhesion property of the second conductive polymer layer 6 to the graphite layer 7 is less than the case of any of the first to twelfth examples of the invention. It is supposed that the difference in degree of the adhesion property is strengthened by the thermal shock test and as a result, the difference in degree of change in tan δ and ESR occurs.

As described above, with the fabrication method of a solid electrolyte capacitor according to the present invention, the amount of the deposited powder 5 can be kept substantially constant by controlling the amount of the powder 5 in the fluid and the spraying condition. This means that the amount of the deposited powder 5 does not fluctuate according to the deposited location of the capacitor body 2.

TABLE 1

| USED PROCESS | SURFACE-ROUGHNESS (μm) | C (μF) | tan δ (%) | | ESR (Ω) | |
|---|---|---|---|---|---|---|
| | | | BEFORE TEST | AFTER TEST | BEFORE TEST | AFTER TEST |
| 1ST EXAMPLE | 20 | 9.5 | 2.11 | 2.15 | 0.28 | 0.28 |
| 2ND EXAMPLE | 25 | 9.7 | 2.08 | 2.03 | 0.27 | 0.27 |
| 3RD EXAMPLE | 20 | 9.6 | 2.12 | 2.20 | 0.29 | 0.28 |
| 4TH EXAMPLE | 25 | 9.5 | 2.05 | 2.12 | 0.26 | 0.28 |
| 5TH EXAMPLE | 10 | 9.3 | 1.88 | 1.85 | 0.22 | 0.22 |
| 6TH EXAMPLE | 15 | 9.6 | 1.98 | 1.95 | 0.24 | 0.25 |
| 7TH EXAMPLE | 25 | 9.5 | 2.02 | 1.98 | 0.25 | 0.26 |
| 8TH EXAMPLE | 30 | 9.6 | 2.05 | 2.10 | 0.27 | 0.26 |
| 9TH EXAMPLE | 15 | 9.7 | 1.90 | 1.95 | 0.21 | 0.22 |
| 10TH EXAMPLE | 15 | 9.5 | 1.95 | 1.92 | 0.22 | 0.23 |
| 11TH EXAMPLE | 15 | 9.5 | 1.95 | 1.92 | 0.22 | 0.23 |
| 12TH EXAMPLE | 15 | 9.5 | 1.95 | 1.92 | 0.22 | 0.23 |
| COMPERATIVE EXAMPLE | 2 | 9.5 | 2.09 | 3.67 | 0.28 | 0.37 |

By referring to Table 1, it is found that the comparative example is roughly equivalent to the first to twelfth examples of the present invention in the value of C, and the initial (i.e., before test) values of tan δ and ESR, and that the values of the tan δ and ESR are greatly changed before and after the thermal shock test.

In addition, it is found that the degree of the surface irregularities or roughness of the second conductive polymer Further, since it is easy to control the amount of the powder 5 contained in the fluid and the spraying condition, the amount of the deposited powder 5 can be kept constant for a long time.

Accordingly, the surface irregularity of the second conductive polymer layer 6 can be formed with good controllability and good stability This leads to high reliability in operation of a solid electrolytic capacitor due to a high thermal shock resistance in dielectric loss (tan δ) and the equivalent series resistance (ESR).

While the preferred forms of the present invention has been described, it is to be understood that modifications will be apparent to those skilled in the art without departing from the spirit of the invention. The scope of the invention, therefore, is to be determined solely by the following claims.

What is claimed is:

1. A fabrication method of a solid electrolytic capacitor, said method comprising the steps of:
   (a) forming a capacitor body by a valve metal;
      said body serving as an anode of said capacitor;
   (b) forming an oxide layer to cover the surface of said capacitor body;
      said oxide layer serving as a dielectric of said capacitor;
   (c) forming a first conductive polymer layer on said oxide layer;
      said first conductive polymer layer serving as a part of a solid electrolyte of said capacitor;
   (d) depositing a powder of a conductive polymer on said first conductive polymer layer by spraying a fluid containing said powder on said first conductive polymer; and
   (e) forming a second conductive polymer layer on said first conductive polymer layer to cover said deposited powder;
      the surface of said second conductive polymer layer having irregularities corresponding to said deposited powder;
      said second conductive polymer layer serving as another part of said solid electrolyte of said capacitor.

2. The method as claimed in claim 1, wherein a gas is used as said fluid in the step (d).

3. The method as claimed in claim 1, wherein a liquid is used as said fluid in the step (d).

4. The method as claimed in claim 3, wherein said liquid is one selected from the group consisting of a solution of a conductive polymer, a solution of an oxidizing agent of a conductive polymer, a solution of a monomer of a conductive polymer.

5. A fabrication method of a solid electrolytic capacitor, said method comprising the steps of:
   (a) forming a capacitor body by a valve metal;
      said body serving as an anode of said capacity;
   (b) forming an oxide layer to cover the surface of said capacitor body;
      said oxide layer serving as a dielectric of said capacitor;
   (c) forming a first conductive polymer layer on said oxide layer;
      said first conductive polymer layer serving as a part of a solid electrolyte of said capacitor;
   (d) depositing a powder of a conductive polymer on said first conductive polymer layer; and
   (e) forming a second conductive polymer layer on said first conductive polymer layer to cover said deposited powder;
      the surface of said second conductive polymer layer having irregularities corresponding to said deposited powder;
      said second conductive polymer layer serving as another part of said solid electrolyte of said capacitor;
      wherein the step (d) of depositing said powder of said conductive polymer is performed by (d-1) applying a solution of said conductive polymer of said powder to the surface of said first conductive polymer layer, thereby wetting the surface of said first conductive polymer layer; and (d-2) spraying said solution on the wetted surface of said first conductive polymer, thereby depositing said powder on the surface of said first conductive polymer.

6. A fabrication method of an electrolytic capacitor, said method comprising the steps of:
   (a) forming a capacitor body by a valve metal;
      said body serving as an anode of said capacity;
   (b) forming an oxide layer to cover the surface of said capacitor body;
      said oxide layer serving as a dielectric of said capacitor;
   (c) forming a first conductive polymer layer on said oxide layer;
      said first conductive polymer layer serving as a part of a solid electrolyte of said capacitor;
   (d) depositing a powder of a conductive polymer on said first conductive polymer layer; and
   (e) forming a second conductive polymer layer on said first conductive polymer layer to cover said deposited powder;
      the surface of said second conductive polymer layer having irregularities corresponding to said deposited powder;
      said second conductive polymer layer serving as another part of said solid electrolyte of said capacitor;
      wherein the step (d) of depositing said powder of said conductive polymer is performed by (d-1) mixing said powder of said conductive polymer with a solution of said conductive polymer; and (d-2) spraying said solution containing said powder on the surface of said first conductive polymer, thereby depositing said powder on the surface of said first conductive polymer.

7. A fabrication method of an electrolytic capacitor, said method comprising the steps of:
   (a) forming a capacitor body by a valve metal;
      said body serving as an anode of said capacity;
   (b) forming an oxide layer to cover the surface of said capacitor body;
      said oxide layer serving as a dielectric of said capacitor;
   (c) forming a first conductive polymer layer on said oxide layer;
      said first conductive polymer layer serving as a part of a solid electrolyte of said capacitor;
   (d) depositing a powder of a conductive polymer on said first conductive polymer layer; and
   (e) forming a second conductive polymer layer on said first conductive polymer layer to cover said deposited powder;
      the surface of said second conductive polymer layer having irregularities corresponding to said deposited powder;
      said second conductive polymer layer serving as another part of said solid electrolyte of said capacitor;
      wherein the step (d) of depositing said powder of said conductive polymer is performed by (d-1) mixing said powder of said conductive polymer with a solution of an oxidizing agent; (d-2) spraying said solution containing said powder on the surface of said first conductive polymer; and (d-3) applying a solution of a monomer to the surface of said first conductive polymer to chemically polymerizing said monomer using said oxidizing agent, thereby depositing said powder on the surface of said first conductive polymer.

8. A fabrication method of an electrolytic capacitor, said method comprising the steps of:

(a) forming a capacitor body by a valve metal;
said body serving as an anode of said capacity;

(b) forming an oxide layer to cover the surface of said capacitor body;
said oxide layer serving as a dielectric of said capacitor;

(c) forming a first conductive polymer layer on said oxide layer;
said first conductive polymer layer serving as a part of a solid electrolyte of said capacitor;

(d) depositing a powder of a conductive polymer on said first conductive polymer layer; and (e) forming a second conductive polymer layer on said first conductive polymer layer to cover said deposited powder;
the surface of said second conductive polymer layer having irregularities corresponding to said deposited powder;
said second conductive polymer layer serving as another part of said solid electrolyte of said capacitor;
wherein the step (d) of depositing said powder of said conductive polymer is performed by (d-1) mixing said powder of said conductive polymer with a solution of a monomer, (d-2) spraying said solution containing said powder on the surface of said first conductive polymer; and (d-3) applying a solution of an oxidizing agent to the surface of said first conductive polymer layer to chemically polymerizing said monomer using said oxidizing agent, thereby depositing said powder on the surface of said first conductive polymer.

9. A fabrication method of an electrolytic capacitor, said method comprising the steps of:

(a) forming a capacitor body by a valve metal;
said body serving as an anode of said capacity;

(b) forming an oxide layer to cover the surface of said capacitor body;
said oxide layer serving as a dielectric of said capacitor;

(c) forming a first conductive polymer layer on said oxide layer;
said first conductive polymer layer serving as a part of a solid electrolyte of said capacitor;

(d) depositing a powder of a conductive polymer on said first conductive polymer layer; and (e) forming a second conductive polymer layer on said first conductive polymer layer to cover said deposited powder;
the surface of said second conductive polymer layer having irregularities corresponding to said deposited powder;
said second conductive polymer layer serving as another part of said solid electrolyte of said capacitor;
wherein the step (d) of depositing said powder of said conductive polymer is performed by (d-1) applying a solution of a monomer to the surface of said first conductive polymer layer; (d-2) mixing said powder of said conductive polymer with a solution of an oxidizing agent; and (d-3) spraying said solution containing said powder on the surface of said first conductive polymer to chemically polymerizing said monomer using said oxidizing agent, thereby depositing said powder on the surface of said first conductive polymer.

10. A fabrication method of an electrolytic capacitor, said method comprising the steps of:

(a) forming a capacitor body by a valve metal;
said body serving as an anode of said capacity;

(b) forming an oxide layer to cover the surface of said capacitor body;
said oxide layer serving as a dielectric of said capacitor;

(c) forming a first conductive polymer layer on said oxide layer;
said first conductive polymer layer serving as a part of a solid electrolyte of said capacitor;

(d) depositing a powder of a conductive polymer on said first conductive polymer layer; and (e) forming a second conductive polymer layer on said first conductive polymer layer to cover said deposited powder;
the surface of said second conductive polymer layer having irregularities corresponding to said deposited powder;
said second conductive polymer layer serving as another part of said solid electrolyte of said capacitor;
wherein the step (d) of depositing said powder of said conductive polymer is performed by (d-1) applying a solution of an oxidizing agent to the surface of said first conductive polymer layer; (d-2) mixing said powder of said conductive polymer with a solution of a monomer; and (d-3) spraying said solution containing said powder on the surface of said first conductive polymer to chemically polymerizing said monomer using said oxidizing agent, thereby depositing said powder on the surface of said first conductive polymer.

* * * * *